(No Model.)
P. A. DUDLEY & F. G. KLECKLER.
CUTTING IMPLEMENT.
No. 497,568. Patented May 16, 1893.
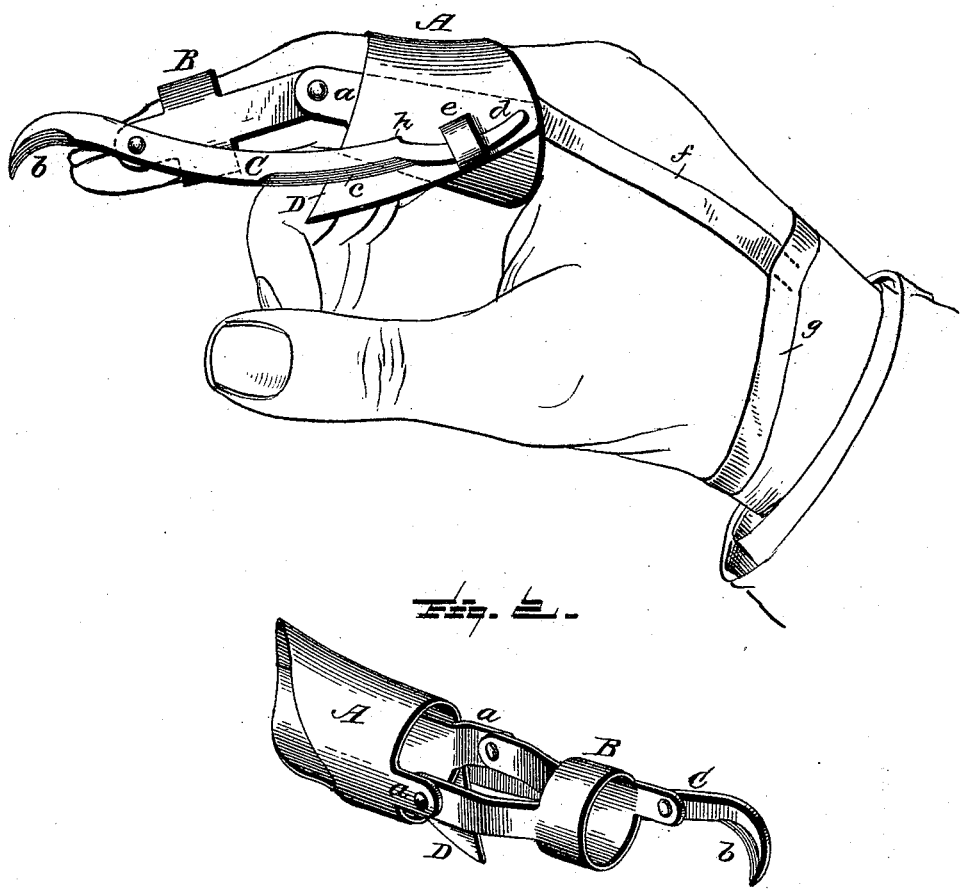
Witnesses
L. C. Hills.
W. M. Brooks.
Inventors
Plummer A. Dudley.
Frank G. Kleckler.
per Chas. H. Fowler
Attorney

United States Patent Office.

PLUMMER ATWOOD DUDLEY AND FRANK GERALD KLECKLER, OF BATH, NEW YORK.

CUTTING IMPLEMENT.

SPECIFICATION forming part of Letters Patent No. 497,568, dated May 16, 1893.

Application filed October 19, 1892. Serial No. 449,420. (No model.)

*To all whom it may concern:*

Be it known that we, PLUMMER ATWOOD DUDLEY and FRANK GERALD KLECKLER, of Bath, Steuben county, New York, have invented a new and useful Cutting Implement; and we certify the following to be a clear, full, and exact description of the said invention, reference being had to the accompanying drawings, which form a part of this specification.

The present invention has relation to that class of shears or cutting implements adapted for attachment to the finger or fingers of the hand and operated thereby when used to pick grapes and other fruit, or used by florists, or for any purpose to which an implement of this character may be found useful.

The object of the invention is to improve the construction of the above mentioned class of devices or implements whereby its value will be materially enhanced, its effectiveness as a cutting tool or device insured, and its operation rendered simple and reliable.

The above objects are attained by the construction substantially as shown in the drawings and hereinafter described and claimed.

Figure 1 of the drawings is a view of the cutting implement showing it in position on the index finger of the hand and held thereon by the harness connected thereto and extending around the wrist; Fig. 2 a perspective view of the implement detached from the hand and without the harness.

In the accompanying drawings A represents a suitable sleeve adapted to slip over the index-finger of the hand, which sleeve is preferably of metal and provided with outwardly extending tongues $a$ to which is pivoted a yoke B of any desirable form that will allow the end of the finger to be inserted therein. Pivoted to the forward end of the yoke B is a knife-blade C which has at its forward end a hooked cutter $b$ and a shear cutting edge $c$ located upon the blade, back of its pivotal connection with the yoke. The rear end of the blade terminates in a curved shank $d$ which extends through a guide $e$ upon the side of the sleeve A and holds the blade in its proper position and prevents any lateral strain thereon and on the pivot which connects it with the yoke B.

The sleeve A is provided with a shear cutting blade D which acts in conjunction with the cutting edge $c$ of the blade C and the shear cut is made by the contraction of the finger which will give to the blade the required motion to sever any stem of the fruit or flowers to be picked with comparatively little trouble.

When the condition is such that it would be inconvenient to apply the shears as above described, the hooked cutter $b$ is used. When the implement is upon the hand, the sleeve A and yoke B will be in position upon the index-finger with relation to the joints thereof as shown in Fig. 1, and to hold the implement in place, a suitable harness is provided, consisting preferably of the strap $f$ connecting with the sleeve and the wrist-strap $g$. The strap $f$ is preferably of elastic material so as to give to the motion of the hand when in the act of cutting with the implement.

To limit the backward movement of the blade C a stop $h$ is provided which is located at the extremity of the blade and between it and the shank $d$, said stop coming against the guide $e$ when the blade is moved backward in making the shear cut.

Having now fully described our invention, what we claim as new, and desire to secure by Letters Patent, is—

1. A cutting implement, consisting of a sleeve and a yoke pivoted together and adapted to slip over the finger of the hand, said sleeve having a cutting blade, and a guide and a cutting blade pivoted to the yoke and acting in conjunction therewith to produce a shear-cut, and a hooked cutter upon the end of the pivoted blade, substantially as and for the purpose set forth.

2. In a cutting implement, a sleeve having a cutting-blade and a guide upon its side, a yoke pivoted to the sleeve, and a cutting blade pivoted to the yoke and a shank and stop upon its rear end, combined to operate substantially as and for the purpose specified.

3. In a cutting implement, a sleeve having a cutting-blade, and a guide thereon a yoke pivoted to the sleeve, and a cutting blade pivoted to the yoke and acting in conjunction with the blade upon the sleeve to produce a shear-cut, in combination with a harness for the hand to hold the implement in place and provided with an elastic strap, substantially as and for the purpose set forth.

4. A cutting implement, consisting of a suitable sleeve having a cutting blade and guide, a yoke pivoted to the sleeve, and a cutting blade having upon its respective ends a hooked cutter, and a shank and stop, substantially as and for the purpose set forth.

PLUMMER ATWOOD DUDLEY.
FRANK GERALD KLECKLER.

Witnesses:
IDA H. LINDSAY,
MURRAY WILBER.